United States Patent [19]

Foulkes

[11] 4,055,676
[45] Oct. 25, 1977

[54] REPLACEMENT OF SUGAR IN A SUGAR-CONTAINING FOOD AND PROCESS

[75] Inventor: Peter H. Foulkes, Fox River Grove, Ill.

[73] Assignee: The Quaker Oats Company, Chicago, Ill.

[21] Appl. No.: 672,659

[22] Filed: Apr. 1, 1976

Related U.S. Application Data

[63] Continuation-in-part of Ser. No. 579,224, May 20, 1975, abandoned.

[51] Int. Cl.² ............................ A23B 4/12; A23B 4/14
[52] U.S. Cl. .................................... 426/532; 426/332; 426/335; 426/641; 426/644; 426/656; 426/658; 426/805
[58] Field of Search ............... 426/805, 532, 641, 644, 426/656, 658, 332, 335

[56] References Cited

U.S. PATENT DOCUMENTS

| | | | |
|---|---|---|---|
| 3,202,514 | 8/1965 | Burgess et al. | 426/532 |
| 3,732,112 | 5/1973 | Frankenfeld | 426/335 X |

OTHER PUBLICATIONS

Zimmerman et al., Handbook of Material Trade Names, 1953, Industrial Research Service, Dover, New Hampshire, p. 245.

*Primary Examiner*—Joseph M. Golian
*Attorney, Agent, or Firm*—Mathew R. P. Perrone, Jr.

[57] ABSTRACT

In a sugar-containing food, the sugar is at least partially replaced with a composition comprising corn syrup, and at least one polyhydric component selected from the group consisting of propylene glycol and 1,3-butanediol. This sugar-replacement is especially effective in semi-moist pet foods.

5 Claims, No Drawings

4,055,676

REPLACEMENT OF SUGAR IN A SUGAR-CONTAINING FOOD AND PROCESS

CROSS-REFERENCE TO RELATED APPLICATIONS

This application is a Continuation-in-Part Application of Application Ser. No. 579,224 filed May 20, 1975 and now abandoned.

BACKGROUND OF THE INVENTION

This invention relates to a food, and more particularly to a semi-moist food having sugar replaced therein with a corn syrup, and at least one polyhydric component selected from the group consisting of propylene glycol, and 1,3-butanediol.

Within the class of pet foods, there are three general subdivisions — dry pet food, semi-moist pet food, and moist pet food. Dry pet food generally has a moisture content less than about 15 percent. Semi-moist pet food generally has a moisture content of about 15 to about 50 percent. Moist pet foods generally have a moisture content in excess of about 50 percent. By "moisture content" is meant the amount of water present in the total food composition — either in combination with one or more of the ingredients in the food or as free water, or combinations thereof.

Among the traditional components of a semi-moist pet food is sugar. Due to economic conditions, replacement of sugar is desirable. However, a sugar replacement is difficult to find because sugar contributes to both the microbiological stability and palatability of the semi-moist pet food. It follows that research is necessary to solve the problem and to find a suitable sugar replacement.

Suitable solutions for solving the problem of a high-priced component, in general, include replacing the component in whole or in part with a more economical component or substitute. This problem is difficult in view of the fact that the substitute must maintain or improve the properties of the composition to which it is being added as compared to the composition containing the original component. Furthermore, the substitute must be cost effective as compared to the original component.

The substitute must permit use of a process that is relatively simple to carry out. In this manner, the cost can be kept down and a suitable nutritious component or product can be provided. Furthermore, the new component must provide or require no substantial changes in the process and be processable. If the process must be changed, the process should be capable of being carried out on the presently available equipment without substantial or difficult modification of that equipment.

Typically a semi-moist pet food having a moisture content in the range of 15 to 50 percent is quite stable and can be stored for long periods of time without sterilization or refrigeration. A major factor in this stable pet food is due to the water soluble solids present in the pet foods having a bacteriostatic affect. Customarily, however, the weight level of the water soluble solids in the food must be greater than that of the moisture. Also, the sugar level must constitute a major percent by weight of the water soluble solids. This high concentration of sugar is undesirable — especially due to the current economic conditions. The high solute concentration also tends to limit moisture to a maximum of about 30 percent in order to preserve the semi-moist characteristics of the food. It is desirable to increase moisture content and thereby improve palatability, while maintaining microbiological stability.

It is customarily assumed that almost any nonreducing and reducing sugars are equivalent for increasing the osmotic pressure of the water and thereby creating a stabilization effect in a semi-moist pet food. If this assumption of equivalence is correct, reducing and non-reducing sugars can be interchangeable. However, such interchangeability must not provide any other undesirable features. Semi-moist pet foods generally contain animal or vegetable proteins. These proteins in combination with reducing sugars or compounds which contain reducing sugars (such as fructose, isomerose, dextrose and maltose) can cause a non-enzymatic browning reaction known as the Maillard-browning reaction. This reaction takes place between the carbonyl group and nucleophilic groups such as $NH_2$ to form a Schiff base. This base undergoes further rearrangement and polymerization causing the formation of dark colored compounds. This reaction is undesirable from at least three aspects. Firstly, the product color is unacceptable due to the formation of the high molecular weight compounds. Secondly, the reaction produces an unsuitable odor thereby affecting acceptability of the food. Thirdly, the reaction with the proteins reduces the effective nutrition capability of the proteins. In other words, not only does the appearance suffer from this reaction, but also the acceptability and the nutritional quality of the semi-moist food suffers. For these reasons, reducing sugars, in general, are not suitable equivalents for non-reducing sugar in a semi-moist pet food. If the Maillard-browning reaction and the problems produced thereby can be controlled, a reducing sugar can be used in a food to replace a non-reducing sugar. Technology, however, has yet to solve that problem.

Thus, it is clear that replacement of a sugar component in a food and particularly semi-moist pet food composition has substantial, difficult, research problems connected therewith.

SUMMARY OF THE INVENTION

Therefore, it is an object of this invention to provide a semi-moist pet food having the sugar replaced therein at least in part.

Also, an object of this invention is to provide a semi-moist pet food having at least part of the sugar therein replaced with a lower cost component.

Further, it is an object of this invention to provide a semi-moist pet food which has maintained palatability.

A still further object of this invention is to provide a semi-moist pet food having at least part of the sugar therein replaced and having a maintained microbiological stability.

Yet another object of this invention is to provide a replacement for sugar in semi-moist pet foods.

A further object of this invention is to provide a sugar replacement for a semi-moist pet food having a reduced tendency to undergo a Maillard-browning reaction.

Still another object of this invention is to provide a heretofor sugar-containing food having the sugar replaced therein at least in part.

Also, an object of this invention is to provide a heretofor sugar-containing food having at least part of the sugar therein replaced with a lower cost component.

Further, it is an object of this invention to provide a heretofor sugar-containing food which has maintained palatability.

A still further object of this invention is to provide a heretofor sugar-containing food having at least part of the sugar therein replaced and having a maintained microbiological stability.

Yet another object of this invention is to provide a replacement for sugar in heretofor sugar-containing foods.

Still another object of this invention is to provide a sugar replacement for a heretofor sugar-containing food having a reduced tendency to undergo a Maillard-browning reaction.

These and other objects of the invention are met by providing a composition comprising corn syrup, and propylene glycol, 1,3-butanediol, or mixtures thereof and incorporating that composition in a heretofor sugar-containing food as a semi-moist pet food, to replace at least part of the sugar therein.

DESCRIPTION OF THE PREFERRED EMBODIMENTS

This invention relates to a semi-moist pet food having at least part of the sugar therein replaced with a composition comprising a corn syrup and either propylene glycol, 1,3-butanediol or mixtures thereof and the process of forming the semi-moist pet food. While the specification refers to a semi-moist pet food, the concept of this invention, is clearly applicable to other sugar-containing semi-moist foods and the replacement of the sugar with corn syrup and the referenced polyhydric component.

The basic composition for comprising the sugar replacement in semi-moist pet food is corn syrup, and either propylene glycol, or 1,3-butanediol, or mixtures thereof. Corn syrup is a commercially available liquid ingredient customarily measured in the terms of dextrose equivalents. Corn syrup contains reducing sugars which customarily participate in the Maillard-browning reaction. However this invention minimizes that problem. Suitable for this invention is corn syrup having a dextrose equivalent of about 10 to about 60. More preferably the corn syrup has a dextrose equivalent of about 30 to about 50 due to availability and cost effectiveness. Most preferably the dextrose equivalent (DE) is 35 to 45. This combination of propylene glycol or butanediol with corn syrup retards the Maillard-browning reaction sufficiently to produce a stable food containing a reducing sugar.

Dextrose equivalent is a standard basis for measuring the reducing sugars as dextrose of various sweeteners. Further definition thereof is found on page 81 of the book *Symposium: Sweeteners* THE AVI PUBLISHING COMPANY INC., Westport, Connecticut, 1974.

When based on the weight of the semi-moist pet food, the amount of corn syrup is about 3 percent to about 20 percent by weight of the semi-moist pet food. More preferably, the corn syrup is present in the semi-moist pet food about 6 percent to about 17 percent. Most preferably, the corn syrup is present in the semi-moist pet food at an amount of 7 percent to 14 percent. The corn syrup combines with the polyhydric component in a semi-moist pet food to replace the sugar in the pet food.

Of the many polyhydric components customarily used in pet foods, only two are acceptable for use in combination with corn syrup to replace the sugar components of the semi-moist pet food. These two polyhydric components are propylene glycol, and 1,3-butanediol. These polyhydric compounds can be used singly or in combination with the semi-moist pet food. Usually, about 3 percent to about 14 percent by weight of the pet food is the polyhydric component. More preferably, the polyhydric component comprises from about 4 percent to about 12 percent by weight of the semi-moist pet food. Most preferably, the polyhydric component comprises 5 percent to 9 percent.

The combination of corn syrup and polyhydric component replaces 55 percent to 100 percent by weight of the sugar. More preferably, about 70–100 percent of the sugar is replaced by the composition. Most preferably 95 percent to 100 percent of the sugar is replaced by the polyhydric component syrup combination.

Also, it is possible to consider the use of a composition for replacing sugar in a food. This composition generally comprises a polyhydric component as set forth and corn syrup. Generally, the composition comprises 40 to 90 percent corn syrup based on the weight of the composition. More specifically, the composition comprises 50 to 81 percent corn syrup. Most specifically, the composition comprises 53 to 75 percent corn syrup. With regard to the polyhydric component, the composition comprises 10 to 60 percent of a polyhydric component. More particularly, the composition comprises 19 to 50 percent of a polyhydric component. Most specifically, the composition comprises 25 to 47 percent of the polyhydric component. As is clearly set forth above, the polyhydric component is propylene glycol, 1,3-butanediol, or mixtures thereof.

As especially suitable embodiment of this invention is the use of corn syrup having a dextrose equivalent of 42 to 43 in combination with propylene glycol and/or butanediol The corn syrup in combination with propylene glycol and/or butanediol can replace part or all of the sugar in semi-moist products and limit the non-enzymatic browning reaction to an acceptable limit. In fact, it is now known as a result of this invention that a combination of corn syrup having a dextrose equivalent of 42 to 43 and propylene glycol is very suitable for minimizing the browning reaction.

A typical semi-moist pet food has about 3 percent to about 65 percent of at least one protein source therein. The protein source may be all meat, all vegetable, meat meals, or mixtures thereof. The total protein may be less than the cited 65 percent maximum depending on the protein source used. The meat present in the semi-moist pet food is generally present within the range of about 0 percent to about 65 percent by weight of the semi-moist pet food. More preferably the meat is present within the range of about 5 percent to about 40 percent by weight of the semi-moist pet food. Most preferably the meat is present in an amount in the range of about 10 percent to about 35 percent by weight of the semi-moist pet food. By "meat" is meant the flesh of cattle, swine, sheep, goats, horses, whale and other mammals, poultry, and fish.

Meat meals made of the above meats are also suitable protein source ingredients. Bone meal is also suitable. By "meat by-products" and "meat meals" is meant those things accepted by Title 9, Chapter 1, Subchapter H of the Code of Federal Regulations, 1971 Edition. Means are not generally considered meat. From 0 to about 30 percent may be used in a pet food. More preferably meals are used at a range of 0 to 25 percent.

The pet food optionally also contains at least one vegetable protein from sources such as soy, cottonseed, peanut or other suitable vegetable protein. Within the semi-moist pet food, the vegetable protein is present in a total amount of about 0 to 65 percent and more preferably 5 percent to about 50 percent. Most preferred, however, is 10 percent to 45 percent by weight vegetable protein. Protein for the pet food is provided by vegetable protein, animal protein (including meat, meat by-products and meat meals), or mixtures thereof.

A stabilizer suitable for use in this semi-moist pet food is a three component stabilizer comprising at least one polyhydric component which also combines with the corn syrup to replace the sugar, at least one edible acid, and at least one antimycotic. Generally speaking, the polyhydric component is present in the amounts above stated and serves as both a stabilizer component and a sugar replacement. The edible acid is generally present in an amount 0 to about 3 percent by weight of the semi-moist pet food. More preferably 0.1 percent acid to 2.5 percent acid is used. The antimycotic is generally present in an amount up to about 0.5 percent by weight of the semi-moist pet food. More preferably 0.01 percent to 0.3 percent antimycotic is used.

A suitable edible acid includes acids such as fumaric acid, hydrochloric acid, citric acid and acetic acid. However, phosphoric acid is preferred because of phosphorus content, availability, and other desirable features. A suitable antimycotic includes potassium sorbate, sorbic acid, calcium propionate, and methyl/propyl paraben. The preferred antimycotic is potassium sorbate.

Other additives present in the semi-moist composition optionally include, but are not limited to, a vitamin mix, a mineral mix, and a coloring agent. It is possible to use a dye for appearance reasons. The mineral mix and the vitamin mix are added for nutritional purposes. A further additive to the pet food may be at least one salt added for purposes of taste, nutrition, another suitable reason, or a combination of purposes which are well known in the art. Typical salts include sodium chloride (table salt — either iodized or uniodized), and potassium chloride. These additives may total up to 10 percent by weight of the pet food. More preferably, these additives may total 0.25 percent to 5.0 percent.

Other additives are disclosed in U.S. Pat. Nos. 3,380,832 to Bone, and 3,765,902 to Charter, both patents being incorporated herein by reference. Additionally the patents illustrate semi-moist pet foods modifiable by this invention.

An especially suitable product of this invention is in the semi-moist category of pet foods. The moisture content ranges from about 13 percent to about 50 percent by weight of the product. More preferably the moisture content is 15 percent to 45 percent. Most preferably the moisture content is 18 percent to 40 percent. By moisture content is meant the water content of the semi-moist pet food whether the water is present as free water, part of at least one other pet food component, or combinations thereof.

Throughout the specification, and in the following examples which are intended to illustrate without unduly limiting the invention, all parts and percentages are by weight of the semi-moist pet food unless otherwise specified.

EXAMPLE 1

The following ingredients are assembled and used in the proportions listed in Table I:
Beef gullets
Beef tripe
Beef intestines
Sugar
Corn Syrup, 42-43 DE
Dextrose
Sorbitol
Isomerose
Soy flour
Vitamin Mix, Mineral Mix, Color blend and salts
Potassium sorbate
Animal fat
Phosphoric acid
Propylene glycol These ingredients are admixed together in the following sequence. The drys are added first. The drys include the soy flour, wheat flour, the salt, the potassium sorbate, the vitamin mix, the mineral mix, and the coloring. Then the liquids are added — animal fat, propylene glycol, phosphoric acid. Then the beef gullets, beef tripe, beef intestines are added. As a final step the corn syrup is added. All of the ingredients thus added are mixed until a homogeneous dough is achieved. This dough is simultaneously extruded and heated with an outlet temperature of 200° F. The final product has a moisture content of about 25 percent. The product is then shaped and packaged in a suitable fashion known in the art.

TABLE I

| Ingredients | Formula A Control | Formula B Sorbitol | Formula C Corn Syrup | Formula D Isomerose | Formula E Dextrose | Formula F 3% Dextrose |
|---|---|---|---|---|---|---|
| Beef Tripe | 10.0 | 10.0 | 10.0 | 10.0 | 10.0 | 10.0 |
| Beef Intestines | 10.0 | 10.0 | 10.0 | 10.0 | 10.0 | 10.0 |
| Beef Gullets | 10.0 | 10.0 | 10.0 | 10.0 | 10.0 | 10.0 |
| Sugar | 20.0 | 11.0 | 11.0 | 11.0 | 11.0 | 17.0 |
| Corn Syrup, 42-43 DE | — | — | 9.0 | — | — | — |
| Dextrose | — | — | — | — | 9.0 | 3.0 |
| Sorbitol | — | 9.0 | — | — | — | — |
| Isomerose | — | — | — | 9.0 | — | — |
| Soy Flour | 36.0 | 36.0 | 36.0 | 36.0 | 36.0 | 36.0 |
| Vitamin Mix, Mineral Mix, Color Blend and Salts | 3.6 | 3.6 | 3.6 | 3.6 | 3.5 | 3.6 |
| Potassium Sorbate | 0.2 | 0.2 | 0.2 | 0.2 | 0.2 | 0.2 |
| Animal Fat | 2.75 | 2.75 | 2.75 | 2.75 | 2.75 | 2.75 |
| Phosphoric Acid | 0.25 | 0.25 | 0.25 | 0.25 | 0.25 | 0.25 |
| Propylene Glycol | 4.0 | 4.0 | 4.0 | 4.0 | 4.0 | 4.0 |
| Water | 3.0 | — | — | — | 3.0 | 3.0 |

Table I shows six semi-moist pet food formulas A-F in which part of the sugar of Formula A is replaced by other sweeteners in formulas B-F. Of these formulas, A contains sugar as a control. All of these formulas are stored at room temperature (about 73° F.) for about 6 months. After storage, a rate of the lysine loss is determined as a measure of the rate of browning. As the lysine present decreases the greater degree of browning occurs. Table II shows the lysine content of six formulations after six months' storage. The formulas containing all sucrose, and sorbitol as sweeteners have the most lysine (and therefore the least browning) because these sugars are non-reducing sugars. The fact that they are non-reducing sugars minimizes the browning reaction. The other formulas in decreasing order of lysine content are corn syrup, isomerose and dextrose. As the disappearance of lysine is associated with an inversely proportional to nonenzymatic Maillard-browning reaction rate, it is concluded that corn syrup limits the rate of this reaction when compared to the other reducing sugars. This is attributable to the presence of propylene glycol.

It must be noted that the examples presented in Table II represent sucrose substitutes in which the substitute sugars represent varying degrees of dextrose equivalent substitutions. For example, the dextrose equivalency of the example containing 3 percent dextrose corresponds to the dextrose equivalency of the example containing 9 percent corn syrup.

TABLE II

| Component | Formula A Control Sucrose | Formula B Sorbitol | Formula C Corn Syrup | Formula D Isomerose* | Formula E,F. Dextrose |
|---|---|---|---|---|---|
| glysine/16gN | 5.8 | 5.5 | 5.2 | 4.2 | 2.9/4.0 |
| Storage Time (months) | 6 | 6 | 6 | 6 | 6 |
| Concentration % by weight | 9 | 9 | 9 | 9 | 9%/3% |

*High fructose syrup

As shown in Table II, corn syrup has the least Maillard-browning effect of the components containing a reducing group. Sucrose and Sorbitol contain no significant reducing groups.

EXAMPLE 2

The following ingredients of Table III are used to formulate pet foods A–D having 36 percent final product moisture and 70 percent by weight of the sugar replaced with corn syrup. Each of pet foods, A, B, C, and D vary the meat content thereof and form a suitable pet food at these meat variations.

TABLE III

| | Parts | | | |
|---|---|---|---|---|
| | A | B | C | D |
| Beef tripe | 10.0 | 10.0 | 5 | 10 |
| Beef intestines | 10.0 | 10.0 | 10 | 5 |
| Beef gullets | 10.0 | 15.0 | 0 | 5 |
| Sugar | 7.0 | 7.0 | 7.0 | 7.0 |
| Corn syrup 42–43 DE | 9.0 | 9.0 | 9.0 | 9.0 |
| Soy flour | 36.0 | 36.0 | 40.0 | 30.0 |
| Vitamin mix, mineral mix, salts, and color blend | 5.2 | 5.2 | 5.2 | 5.2 |
| Potassium sorbate | 0.2 | 0.2 | 0.2 | 0.2 |
| Animal fat | 2.75 | 0 | 1.0 | 1.5 |
| Phosphoric acid | 0.25 | 0.25 | 0.25 | 0.25 |
| Propylene glycol | 7.0 | 7.0 | 7.0 | 7.0 |
| Wheat flour | 3.0 | 3.0 | 5.0 | 10.0 |
| Water | 12.0 | 12.0 | 12.0 | 12.0 |

This food A is fed twice in a 2-component feeding test against the all sugar control A food of Example 1. The palatability of the test product is shown to be as acceptable as the control.

EXAMPLE 3

The following ingredients as listed in Table IV are assembled and formulated into a pet food to illustrate that a suitable pet food is formulated with increasing reductions of sugar including complete absence of sugar.

TABLE IV

| | A Parts | B Parts | C Parts | D Parts |
|---|---|---|---|---|
| Beef tripe | 10.0 | 10.0 | 10.0 | 10.0 |
| Beef intestines | 10.0 | 10.0 | 10.0 | 10.0 |
| Beef udders | 10.0 | 10.0 | 10.0 | 10.0 |
| Sugar | 14.0 | 4.0 | — | — |
| Corn syrup 42–43 DE | 9.0 | 9.0 | 9.0 | 9.0 |
| Vegetable protein | 36.0 | 36.0 | 36.0 | 36.0 |
| Vitamin mix, mineral mix, salts & color blend | 5.2 | 5.2 | 5.2 | 5.2 |
| Potassium sorbate | 0.2 | 0.2 | 0.2 | 0.2 |
| Phosphoric acid | 0.25 | 0.25 | 0.25 | 0.25 |
| Propylene glycol | 4.0 | 7.0 | 7.0 | 4.0 |
| Wheat flour | — | 3.0 | 7.0 | 10.0 |
| Water | 12.0 | 12.0 | 12.0 | 4.0 |

The ingredients listed in Formula C of Table IV are formed in a standard fashion into a semi-moist pet food. The pet food formed contains 30 percent moisture and a total of 16.4 percent water soluble solutes and has a pH between 6.0 and 6.7. Thus it may be seen that this product has a moisture content greater than the water solubles. In addition, corn syrup makes only 44 percent of the soluble solids. The remainder of the soluble solids are propylene glycol, potassium sorbate, salts and acids. With this combination of soluble solutes the product exhibits microstatic effect when challenged with bacteria yeast and mold. The product after being sprayed with microorganisms shows a three- to four-fold decrease in two weeks at 32° C. as reported in Table V. This stability is believed to be due to the combination of corn syrup and propylene glycol. This stability at 30 percent moisture and 16.4 percent soluble solids at a pH of around pH 6-8, is unique in the semi-moist pet food. Both the corn syrup and the propylene glycol when added to the semi-moist pet food seem to hydrate to such an extent that less soluble solids are needed for microstability at a given moisture.

TABLE V

| | INOCULATED | | | CONTROL | | |
|---|---|---|---|---|---|---|
| Time | Plate Count | Staph | Y + M | Plate Count | Staph | Y + M |
| 0 | $1.62 \times 10^4$ | $6.2 \times 10^3$ | $1.06 \times 10^3$ | 390 | <100 | <10 |
| 2 wks. | 600 | <100 | <10 | $1.1 \times 10^3$ | | |
| 4 | 300 | | | 100 | | |
| 6 ↓ | 330 | ↓ | ↓ | 200 | ↓ | ↓ |
| 8 | 270 | | | 380 | | |

EXAMPLE 4

The ingredients of Table VI are assembled and formed into a suitable pet food in a standard fashion with 100 percent sugar reduction using 1,3-butanediol.

TABLE VI

|  | Parts |
|---|---|
| Beef tripe | 10.0 |
| Beef intestines | 15.0 |
| Pork spleen | 5.0 |
| Sugar | — |
| Corn syrup 42–43 DE | 9.0 |
| Vegetable Protein | 36.0 |
| Vitamin mix, mineral mix, salts & color blend | 5.2 |
| Potassium sorbate | 0.2 |
| Vegetable fat | 2.75 |
| Phosphoric acid | 0.25 |
| 1,3-butylene glycol | 7.0 |
| Wheat flour | 7.0 |
| Water | 12.0 |

EXAMPLE 5

The ingredients of Table VII are assembled and formed into a suitable pet food in a standard fashion with 70 percent and 100 percent sugar replacement using 30 DE corn syrup.

TABLE VII

|  | Parts | Parts |
|---|---|---|
| Beef tripe | 10.0 | 10.0 |
| Beef intestines | 10.0 | 10.0 |
| Beef gullets | 10.0 | 10.0 |
| Sugar | 7.0 | — |
| Corn syrup 30 DE | 9.0 | 9.0 |
| Vegetable protein | 36.0 | 36.0 |
| Vitamin mix, mineral mix, salts & color blend | 5.2 | 5.2 |
| Potassium sorbate | 0.2 | 0.2 |
| Animal fat | 1.75 | 2.75 |
| Phosphoric acid | 0.25 | 0.25 |
| Propylene glycol | 7.0 | 7.0 |
| Wheat flour | 3.0 | 7.0 |
| Water | 12.0 | 12.0 |

EXAMPLE 6

The ingredients of Table VIII are assembled and formed into a suitable pet food in a standard fashion using 60 DE corn syrup as 70 percent and 100 percent sugar replacement.

TABLE VIII

|  | Parts | Parts |
|---|---|---|
| Beef tongue | — | 10.0 |
| Beef tripe | 10.0 | 10.0 |
| Beef intestines | 10.0 | 10.0 |
| Beef gullets | 10.0 | 10.0 |
| Sugar | 7.0 | — |
| Corn syrup 60 DE | 9.0 | 9.0 |
| Vegetable protein | 36.0 | 36.0 |
| Vitamin mix, mineral mix, salts & color blend | 5.2 | 5.1 |
| Potassium sorbate | 0.2 | 0.2 |
| Animal fat | 0.75 | 0.75 |
| Phosphoric acid | 0.25 | 0.25 |
| Propylene glycol | 7.0 | 7.0 |
| Wheat flour | 3.0 | 7.0 |
| Water | 12.0 | 12.0 |

EXAMPLE 8

The following semi-moist pet fod formulas are made in a standard fashion and tested to compare the relationship of the Maillard-browning reaction after storage of the product with the average molecular weight of the sweetener selected from the group consisting of corn syrup, isomerose, and corn molasses. Formulas A, B, and C of Table X are substantially the same but for the following differences. Formula A contains 15 parts by weight corn syrup having a dextrose equivalent of 42 – 43. Formula contains 15 parts by weight isomerose. Formula C contains 15 parts by weight corn molasses.

TABLE X

|  | A | B | C |
|---|---|---|---|
| Meat & Meat By-Products | 30.0 | 30.0 | 30.0 |
| Soy Flour | 28.0 | 28.0 | 28.0 |
| Corn Syrup 42–43 DE | 15.0 | — | — |
| Isomerose | — | 15.0 | — |
| Corn Molasses | — | — | 15.0 |
| Propylene Glycol | 7.0 | 7.0 | 7.0 |
| Potassium Sorbate | 0.1 | 0.1 | 0.1 |
| Phosphoric Acid | 0.25 | 0.25 | 0.25 |
| Vitamins, Minerals, Color blend, and Salts | 4.9 | 4.9 | 4.9 |
| Water | 4.4 | 2.5 | 3.6 |
| Grams lysine/16g N after storage at 73° F. for 6 months | 5.4 | 4.8 | 4.6 |

As can be seen from the bottom reading of Table X, the corn syrup product has the least rate of Maillard-browning reaction as evidenced by the higher concentration of grams of lysine per 16 grams of nitrogen than do the other formulas listed in columns B and C. Corn syrup has a higher average molecular weight than does isomerose or corn molasses. Thus, it may be seen that the higher average molecular weight of the reducing sugars in corn syrup provide a reduced Maillard-browning reaction over the isomerose product of Section B of Table X and the corn molasses product of Section C of Table X. This difference in the Maillard-browning rate clearly indicates that the relatively higher average molecular weight of the reducing sugars in corn syrup has an effect on the Maillard-browning reaction. The effect of the corn syrup on the Maillard-browning reaction is a positive one for the purposes of this invention in that the undesirable Maillard-browning reaction products are reduced - thereby providing a product having a minimized Maillard-browning reaction. This minimized Maillard-browning reaction results in a product having an acceptable appearance, lacking the characteristic odor and retaining an acceptable protein quality for the product.

EXAMPLE 9

The following semi-moist pet foods were formulated in a standard fashion and tested to compare the relationship between the quantity of propylene glycol and the Maillard-browning reaction rate. The semi-moist pet foods formulated are listed in Table XI. Product A of Table XI acts as a control and contains 26 parts by weight sugar (sucrose). The major variations of product B and C over control A is that the corn syrup concentration is used to replace the sugar concentration of product A. Also, product B contains 7 parts by weight propylene glycol, whereas product C contains 3 parts by weight propylene glycol.

TABLE XI

|  | A | B | C |
|---|---|---|---|
| Meat & Meat By-Products | 30.0 | 30.0 | 30.0 |
| Soy Flour | 34.0 | 37.0 | 37.0 |
| Sugar | 26.0 | — | — |
| Corn Syrup 42–43 DE | — | 15.0 | 15.0 |
| Propylene Glycol | 4.0 | 7.0 | 3.0 |
| Potassium Sorbate | 0.1 | 0.1 | 0.1 |
| Phosphoric Acid | 0.25 | 0.25 | 0.25 |
| Vitamins, Minerals, Color blend, and Salts | 4.9 | 4.9 | 4.9 |
| Water | 3.4 | 4.4 | 4.4 |

TABLE XI-continued

|  | A | B | C |
|---|---|---|---|
|  | 6.3 | 5.4 | 4.6 |
| after storage at 73° F. for 6 months | | | |

As can be seen by a comparison of the grams lysine per 16 grams nitrogen between Tables B and C, the increase in propylene glycol of 7 parts in Formula B over 3 parts in Formula C provides a reduction of the Maillard-browning reaction in Formula B as compared to Formula C. That is, pet food B has less Maillard-browning reaction than does pet food C. This is clearly attributable to the propylene glycol which is the only substantial change between pet food B and pet food C.

Tables I and II, representing partial sugar replacement and Tables X and XI showing complete sugar replacement, combine to show that propylene glycol in combination with corn syrup provides an acceptable semi-moist pet food having an acceptable Maillard-browning reaction rate. Other reducing sugars when combined with propylene glycol do not result in the reduced Maillard-browning reaction rate. Accordingly, it may be seen that both the average high molecular rate of the reducing sugars contained in corn syrup and the propylene glycol combine to provide a semi-moist pet food having an acceptable Maillard-browning reaction rate while at the same time eliminating sugar (that is sucrose) from the semi-moist pet food. Thus, by virtue of this invention, a heretofor absolutely necessary component (sugar in the form of sucrose) for certain types of semi-moist pet foods, is eliminated.

Having thus fully disclosed and described this new and unique invention, what is claimed and sought to be secured by Letters Patent of the United States is:

1. In a semi-moist pet food comprising:
   a. about 3 percent to about 65 percent by weight of the pet food of a protein source wherein the protein source is at least one selected from the group consisting of at least one meat, at least one meat by-product, and at least one vegetable protein source;
   b. about 0.1 percent to 35 percent by weight of the pet food of sugar;
   c. about 0.5 percent to about 3.0 percent of at least one edible acid;
   d. about 0.01 percent to about 0.35 percent by weight of the pet food of at least one antimycotic;
   the improvement wherein the semi-moist pet food further comprises:
   1. about 7 percent to about 14 percent by weight of the pet food of corn syrup, wherein the corn has a dextrose equivalent of about 10 to about 60; and
   2. about 5 percent to about 9 percent by weight of the pet food of propylene glycol
   the combination of corn syrup and propylene glycol serving as a replacement for 55 to 100 percent of the sugar.

2. The food of claim 1 wherein the combination replaces about 95 percent to 100 percent of the sugar.

3. The food of claim 1 wherein the dextrose equivalent is 35 to 45.

4. The food of claim 3 wherein the combination of corn syrup and propylene glycol replaces 100% of the sugar.

5. The semi-moist pet food of claim 1 wherein the composition replaces about 70 percent to 100 percent of the sugar.

* * * * *